Oct. 26, 1965 Y. J. TALBOT 3,214,578
REAR VISION MIRROR ARRANGEMENTS FOR VEHICLES
Filed March 15, 1962
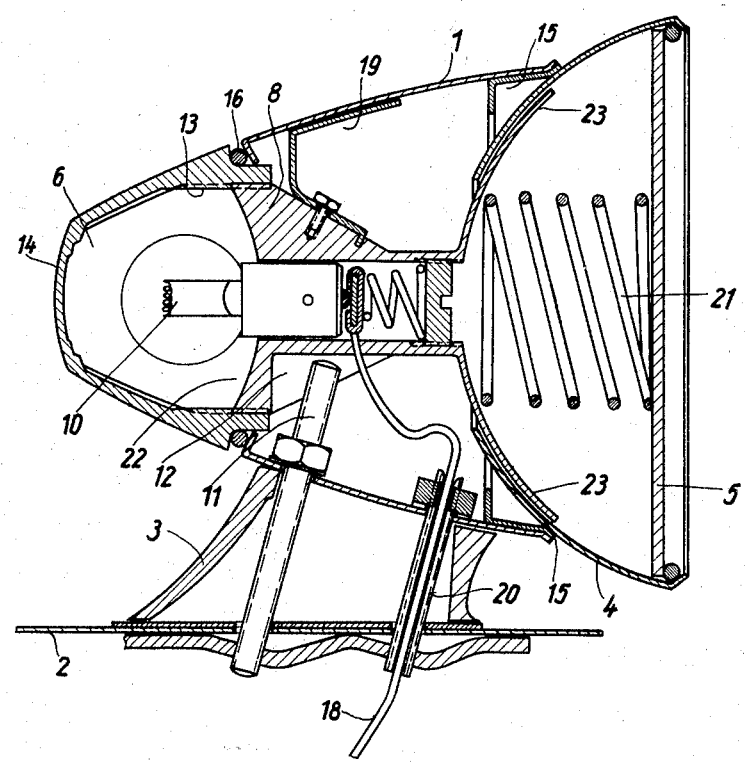
Inventor:

United States Patent Office 3,214,578
Patented Oct. 26, 1965

3,214,578
REAR VISION MIRROR ARRANGEMENTS FOR VEHICLES
Yorck Joachim Talbot, Ballenstederstrasse 7, Berlin-Wilmersdorf, Germany
Filed Mar. 15, 1962, Ser. No. 179,936
Claims priority, application Germany, Mar. 17, 1961, T 19,811
6 Claims. (Cl. 240—4.2)

The invention relates to a rear-vision or rear-view mirror arrangement for a vehicle, and more particularly to a mounting means which is combined with a lamp arrangement so that, in addition to enabling observation of traffic at the rear of a vehicle provided with inventive device, the travelling path of the vehicle may be illuminated or signals given, for example for indicating a desired turning direction of the vehicle.

The invention consists in a rear vision mirror arrangement for a vehicle, comprising a housing adapted for being rigidly or pivotally mounted on the body of the vehicle, the housing having mounted thereon a rear vision mirror, and an electric lamp arrangement for emitting light in a direction substantially opposite to the direction of rear view given by the mirror. Preferably the rear vision mirror is carried by an intermediate member mounted on the housing.

The member carrying the mirror may be rigidly or movably mounted on the housing, the electric lamp arrangement also being rigidly or movably mounted on the housing.

A tensioning member centrally arranged with regard to the housing, or a plurality of non-centrally arranged tensioning members may be provided for securing the mirror, and/or the lamp arrangement, in position with regard to the housing. When the tensioning member is centrally arranged with regard to the housing it may form a holder for the electric bulb and a reflector for the lamp arrangement, the tensioning member being secured against rotation relative to the housing. The tensioning member may be secured against rotation relative to the housing by engaging an extension of a pin for mounting the housing on the vehicle body in a recess provided in the tensioning member.

Preferably the lamp arrangement comprises a cap-like cover through which light from the bulb is emitted, the cover enabling displacement of the tensioning member in the axial direction of the housing so that the member carrying the mirror is drawn into firm contact with the housing. Sealing members may be provided between the housing and the mirror or the member carrying the mirror, and between the housing and a cap-like cover of the lamp holder. The sealing members may be round, rectangular, L-shaped or S-shaped in cross-section.

In order to make the invention clearly understandable, reference will now be made to the accompanying drawing in which the sole figure is a longitudinal sectional view of a rear vision mirror arrangement.

The rear vision mirror arrangement comprises a hollow housing 1 of approximately frustoconical shape, which is open at both ends. The housing 1 is secured to the body work 2 of a vehicle by means of a foot 3, a bolt 11 and an oblique, hollow bolt 20, so that the wider end of the housing 1 faces towards the rear of the vehicle.

A sealing ring 15 which is L-shaped in cross-section is inserted in the rearwardly facing end of the housing 1, its outer rim providing a seat for a cup-shaped member 4 which carries a rear vision mirror 5. An electric lamp arrangement 6 is provided at the forwardly facing end of the housing 1, the lamp arrangement 6 comprising a holder for an electric bulb 10 and a transparent cup-like cover 14, a sealing ring 16 being provided between the cover 14 and the housing 1. The cup-shaped member 4 and the cup-like cover 14 are held in the desired positions relative to the housing 1 by a tensioning member 8 which is centrally arranged in the housing 1 and which may be a moulded component, the tension member 8 engaging the cup-shaped member 4 by means of a funnel-like portion 23 and engaging the cup-like cover 14 by means of externally provided screw threads onto which the cover 14 is screwed by virtue of internal screw threads 13 provided on the cover 14. By rotating the cover 14 in the screw thread tightening direction, the cover 14 and the cup-shaped member 4 are clamped tightly against the housing 1, the sealing rings 15 and 16 being compressed. The tensioning member 8 is prevented from rotating, during rotation of the cover 14, by engagement of an extended portion of the bolt 11 in a slot-shaped recess 12 formed in the tensioning member 8. The dimensions of the recess 12 are such that assembled in the mirror arrangement, the tensioning member 8 can move relative to the bolt 11 in the axial direction to a certain extent.

The bulb 10 is mounted in known manner in a central bore of the tensioning member 8, which is adapted to form a holder for the bulb 10. A portion 22 of the tensioning member 8, surrounding the central bore, is concavely shaped so as to form a reflector for the bulb 10. The shell of the base of bulb 10 is connected to the vehicle body work 2 by the tensioning member 8, which is metallic, a contact spring 19 which is secured to the tensioning member 8 and engages the housing 1, the housing 1 itself, and the bolt 11. The central contact of the base of bulb 10 is connected to the electrical system of the vehicle by a wire 18 which passes through the hollow bolt 20. It will be appreciated that the tensioning member 8 is electrically insulated from the housing 1 by the sealing rings 15 and 16. The rear vision mirror 5 is held in position in the cup-shaped member 4, in engagement with an inturned rim thereof, by a compression spring 21 which acts between the funnel-like portion 23 and the back of the mirror 5.

In mounting the mirror arrangement on the vehicle body work 2, the housing 1 should be so positioned that the lamp arrangement 6 points in the direction in which it is desired that light should be directed, that is to say usually exactly towards the front of the vehicle. If the cover 14 is then rotated in the thread loosening direction, the cup-shaped member 4 can then be moved so that the mirror 5 has the required angular position relative to the driver of the vehicle and the cover 14 re-tightened to secure the cup-shaped member 4 in the adjusted position. Thus, while the mirror 5 has the required angular position with regard to the direction of travel of the vehicle, the lamp arrangement 6 may nevertheless be accurately positioned to direct light exactly in the required direction.

I claim:
1. A rear-view mirror and lamp assembly adapted to be mounted on a vehicle, comprising, in combination, housing means having a longitudinal axis and two open ends; a mirror; mounting means adjustable to differently oriented positions relative to said housing means for holding said mirror in a desired position and being located in one of said open ends of said housing means; lens means located in the other open end of said housing means abutting against a portion of the latter and turnable substantially about said axis thereof; and tensioning means located substantially centrally in said housing means and operatively connecting said lens means with said mounting means, said tensioning means being at one end thereof in threaded engagement with said lens means and being at the other end thereof in overlapping, but relatively adjustable engagement with a portion of said mounting means in such a manner that by turning said lens means in one direction relative to said housing and to said tensioning means said mounting means are urged by said tensioning means into said one open end of said housing means and are fixed in a desired position relative thereto, while by turning said lens means in opposite direction said mounting means are permitted to be moved to differently oriented positions, said tensioning means including at said one end thereof means for carrying an electric lamp in a position substantially central relative to said lens means.

2. A rear-view mirror and lamp assembly adapted to be mounted on a vehicle, comprising, in combination, housing means having a longitudinal axis and two open ends; a mirror; mounting means adjustable to differently oriented positions relative to said houisng means for holding said mirror in a desired position and being located in one of sad open ends of said housing means; lens means located in the other open end of said housing means abutting against a portion of the latter and turnable substantially about said axis thereof; tensioning means located substantially centrally in said housing means and operatively connecting said lens means with said mounting means, said tensioning means being at one end thereof in threaded engagement with said lens means and being at the other end thereof in overlapping, but relatively adjustable engagement with a portion of said mounting means in such a manner that by turning said lens means in one direction relative to said housing and to said tensioning means said mounting means are urged by said tensioning means into said one open end of said housing means and are fixed in a desired position relative thereto, while by turning said lens means in opposite direction said mounting means are permitted to be moved to differently oriented positions, said tensioning means including at said one end thereof means for carrying an electric lamp in a position substantially central relative to said lens means; and holding means for securing said tensioning means against rotation relative to said housing means.

3. A rear-view mirror and lamp assembly adapted to be mounted on a vehicle, comprising, in combination, housing means having a longitudinal axis and two open ends; a mirror; mounting means adjustable to differently oriented positions relative to said housing means for holding said mirror in a desired position and being located in one of said open ends of said housing means; lens means located in the other open end of said housing means abutting against a portion of the latter and turnable substantially about said axis thereof; tensioning means located substantially centrally in said housing means and operatively connecting said lens means with said mounting means, said tensioning means being at one end thereof in threaded engagement with said lens means and being at the other end thereof in overlapping, but relatively adjustable engagement with a portion of said mounting means in such a manner that by turning said lens means in one direction relative to said housing and to said tensioning means said mounting means are urged by said tensioning means into said one open end of said housing means and are fixed in a desired position relative thereto, while by turning said lens means in opposite direction said mounting means are permitted to be moved to differently oriented positions, said tensioning means including at said one end thereof means for carrying an electric lamp in a position substantially central relative to said lens means; holding means for securing said tensioning means against rotation relative to said housing means; and first resilient sealing means mounted between said mounting means and the edge of said one open end of said housing means and second resilient sealing means mounted between said lens means and said portion of said housing means at said other open end thereof.

4. A rear-view mirror and lamp assembly adapted to be mounted on a vehicle, comprising, in combination, housing means having a longitudinal axis and two open ends; a mirror; mounting means adjustable to differently oriented positions relative to said housing means for holding said mirror in a desired position and being located in one of said open ends of said housing means; lens means located in the other open end of said housing means abutting against a portion of the latter and turnable substantially about said axis thereof; tensioning means located substantially centrally in said housing means and operativley connecting said lens means with said mounting means, said tensioning means being at one end thereof in threaded engagement with said lens means and being at the other end thereof in overlapping, but relatively adjustable engagement with a portion of said mounting means in such a manner that by turning said lens means in one direction relative to said housing and to said tensioning means said mounting means are urged by said tensioning means into said one open end of said housing means and are fixed in a desired position relative thereto, while by turning said lens means in opposite direction said mounting means are permitted to be moved to differently oriented positions, said tensioning means including at said one end thereof means for carrying an electric lamp in a position substantially central relative to said lens means; holding means for securing said tensioning means against rotation relative to said housing means; said holding means including a longitudinal recess in said tensioning means and attaching means for attaching said housing means to a portion of said vehicle, a portion of said attaching means extending into said recess.

5. A rear-view mirror and lamp assembly adapted to be mounted on a vehicle, comprising, in combination, housing means having a longitudinal axis and two open ends; a mirror; mounting means adjustable to differently oriented positions relative to said housing means for holding said mirror in a desired position and being located in one of said open ends of said housing means; lens means located in the other open end of said housing means abutting against rotation a portion of the latter and turnable substantially about said axis thereof; tensioning means located substantially centrally in said housing means and operatively connecting said lens means with said mounting means, said tensioning means being at one end thereof in threaded engagement with said lens means and being at the other end thereof in overlapping, but relatively adjustable engagement with a portion of said mounting means in such a manner that by turning said lens means in one direction relative to said housing and to said tensioning means said mounting means are urged by said tensioning means into said one open end of said housing means and are fixed in a desired position relative thereto, while by turning said lens means in opposite direction said mounting means are permitted to be moved to differently oriented positions, said tensioning means including at said one end thereof means for carrying an electric lamp in a position substantially central relative to said lens means; holding means for securing said tensioning means against rotation relative to said housing means, said holding means including a longitudinal recess in said tensioning means and attaching means for attaching means for attaching said housing means to a portion of said vehicle, a portion of said attaching means extending into said recess; and first resilient sealing means mounted between said mounting means and the edge of said one open end of said housing means, and second resilient sealing means mounted between said lens means and said portion of said housing means at said other open end thereof.

6. A rear-view mirror and lamp assembly adapted to be mounted on a vehicle, comprising, in combination, housing means having a longitudinal axis and two open ends; a mirror; mounting means adjustable to differently oriented positions relative to said housing means for holding said mirror in a desired position and being located in one of said open ends of said housing means; lens means located in the other open end of said housing means abutting against a portion of the latter and turnable substantially about said axis thereof; and tensioning means located substantially centrally in said housing means operatively connecting said lens means with said mounting means, said tensioning means being at one end thereof in threaded engagement with said lens means and being at the other end thereof in overlapping, but relatively adjustable engagement with a portion of said mounting means in such a manner that by turning said lens means in one direction relative to said housing and to said tensioning means said mounting means are urged by said tensioning means into said one open end of said housing means and are fixed in a desired position relative thereto, while by turning said lens means in opposite direction said mounting means are permitted to be moved to differently oriented positions, said tensioning means including at said one end thereof means for carrying an electric lamp in a position substantially central relative to said lens means, said means for carrying said lamp including a recess adapted to accommodate the base portion of said lamp and a reflecting surface surrounding said recess.

References Cited by the Examiner

UNITED STATES PATENTS

| | | |
|---|---|---|
| 1,308,182 | 7/19 | Leuckert. |
| 1,559,929 | 11/25 | Bean _____ 240—41.6 X |
| 2,457,348 | 12/48 | Chambers _____ 240—4.2 |
| 2,585,399 | 2/52 | Mead _____ 240—4.2 |
| 2,752,823 | 7/56 | Martin et al. _____ 240—4.2 X |
| 2,878,726 | 3/59 | Tuthill _____ 88—93 X |
| 2,989,619 | 6/61 | Springer _____ 240—78 |
| 3,064,536 | 11/62 | Weingartner _____ 88—98 |

FOREIGN PATENTS 871,881  7/61  Great Britain.

NORTON ANSHER, *Primary Examiner.*

ROBERT L. EVANS, *Examiner.*